(12) United States Patent
Liu et al.

(10) Patent No.: US 9,684,777 B2
(45) Date of Patent: Jun. 20, 2017

(54) IDENTITY AUTHENTICATION METHOD OF AN INTERNET ACCOUNT, IDENTITY AUTHENTICATION DEVICE OF AN INTERNET ACCOUNT AND SERVER

(71) Applicant: Tencent Technology (Shenzhen) Company Limited, Shenzhen (CN)

(72) Inventors: Jinxing Liu, Shenzhen (CN); Yuanhui Xie, Shenzhen (CN); Dongrui Zhang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 190 days.

(21) Appl. No.: 14/660,579

(22) Filed: Mar. 17, 2015

(65) Prior Publication Data
US 2015/0186632 A1    Jul. 2, 2015

Related U.S. Application Data

(63) Continuation of application No. PCT/CN2014/083707, filed on Aug. 5, 2014.

(30) Foreign Application Priority Data

Aug. 9, 2013 (CN) .......................... 2013 1 0346954

(51) Int. Cl.
    *G06F 21/00*      (2013.01)
    *G06F 21/31*      (2013.01)
    *H04L 29/06*      (2006.01)

(52) U.S. Cl.
    CPC .............. *G06F 21/31* (2013.01); *H04L 63/08* (2013.01)

(58) Field of Classification Search
None
See application file for complete search history.

(56) References Cited

U.S. PATENT DOCUMENTS 6,282,658 B2 * 8/2001 French .................... G06F 21/31
                                                          705/38
6,622,131 B1 * 9/2003 Brown .................... G06Q 30/08
                                                          705/1.1

(Continued)

FOREIGN PATENT DOCUMENTS

| CN | 1725684 A | 1/2006 |
| CN | 103179098 A | 6/2013 |

OTHER PUBLICATIONS

ISR to International Application No. PCT/CN2014/083707 dated Nov. 18, 2014, (4p).

*Primary Examiner* — Maung Lwin
(74) *Attorney, Agent, or Firm* — Brinks Gilson & Lione

(57) ABSTRACT

An identity authentication method of an internet account, an identity authentication device of an internet account and a system are provided. The method may includes: receiving an identity authentication request sent by a client device, where the identity authentication request includes account information; acquiring identity authentication information corresponding to the account information, where the identity authentication information is pre-generated based on the account information and includes at least one authentication question and at least two answer options corresponding to the authentication question; sending the identity authentication information to the client device; and receiving, from the client device, answer information obtained by choosing an answer from the at least two answer options corresponding to the authentication question, determining whether the answer information meets a preset condition and providing an identity authentication response to the client device according to a determined result.

20 Claims, 7 Drawing Sheets

(56) References Cited

U.S. PATENT DOCUMENTS

| | | | |
|---|---|---|---|
| 7,337,327 B1* | 2/2008 | Sallam | G06F 21/554 |
| | | | 713/189 |
| 8,131,830 B2* | 3/2012 | Gill | H04L 63/105 |
| | | | 709/223 |
| 2003/0105959 A1* | 6/2003 | Matyas | G06F 21/31 |
| | | | 713/168 |
| 2003/0154406 A1* | 8/2003 | Honarvar | G06Q 10/10 |
| | | | 726/10 |
| 2005/0120201 A1* | 6/2005 | Benaloh | G06F 21/31 |
| | | | 713/155 |
| 2010/0229223 A1* | 9/2010 | Shepard | G06F 21/31 |
| | | | 726/5 |
| 2011/0277025 A1* | 11/2011 | Counterman | H04L 9/3226 |
| | | | 726/8 |
| 2012/0330789 A1* | 12/2012 | Heck | G06Q 10/06 |
| | | | 705/26.41 |
| 2013/0036459 A1* | 2/2013 | Liberman | H04L 9/0866 |
| | | | 726/6 |
| 2013/0144786 A1 | 6/2013 | Tong et al. | |
| 2014/0137203 A1* | 5/2014 | Castro | H04L 63/08 |
| | | | 726/4 |
| 2014/0189845 A1* | 7/2014 | Cai | H04L 63/0245 |
| | | | 726/12 |

* cited by examiner

Please read the following questions carefully and choose a correct answer according to practical situations:

| Which of the following cities do you register your account? | Question: 5/30 |
|---|---|
| ○ A. City 1　○ B. City 2　○ C. City 3　○ D. City 4 | |
| | Next |

Please read the following questions carefully and choose a correct answer according to practical situations:

| Which of the following cities have you been to and logged in your account in during International Workers' Day of 2013? | Question: 6/30 |
|---|---|
| ○ A. City 5　○ B. City 6　○ C. City 7　○ D. City 8 | |
| | Next |

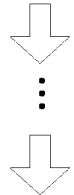

Please read the following questions carefully and choose a correct answer according to practical situations:

| When did you log off your account on June 4, 2013? | Question: 30/30 |
|---|---|
| ○ A. 13 o'clock in midday　○ B. 1 o'clock early in the morning　○ C. 4 o'clock early in the morning　○ D. 23 o'clock in midnigh | |
| | Submit |

Fig. 2

IDENTITY AUTHENTICATION METHOD OF AN INTERNET ACCOUNT, IDENTITY AUTHENTICATION DEVICE OF AN INTERNET ACCOUNT AND SERVER

This application a continuation of International Application No. PCT/CN2014/083707, filed on Aug. 5, 2014, which claims priority of Chinese Patent Application No. 201310346954.3, entitled "IDENTITY AUTHENTICATION METHOD OF AN INTERNET ACCOUNT, IDENTITY AUTHENTICATION DEVICE OF AN INTERNET ACCOUNT AND SERVER", filed with the Chinese Patent Office on Aug. 9, 2013, both of which are hereby incorporated by reference in their entireties.

FIELD

The present application generally relates to the field of computer, and in particular to an identity authentication method of an internet account, an identity authentication device of an Internet account and a system.

BACKGROUND

In the usage of Internet, a user may protect a security of a user account by setting login information of the account. The login information includes for example a password or a password protection question. In an existing technology, in the case that the user fails to log in since the user forgets the login information of the account or the password for the account is stolen, an authentication of an internet account may be performed through an official website provided by an account provider, to retrieve the password for the account. The method for authenticating the internet account may include: retrieve the password for the account by, such as filling in an associated mailbox or an associated communication number, answering the password protection question, submitting an account appeal to the account provider by the user. For example, when the user retrieves the password for the account by submitting an account appeal to the account provider, the user needs to access the official website provided by the account provider, fill historical evidence information of the user account in a webpage provided by the account provider to prove that the user is a real owner of the account, and submit the information to the account provider to authenticate the internet account. The historical evidence information of the user account includes for example a registration time of the account, a historical password of the account, history login information of the account. If the authentication is passed, the login information of the account may be reset. In the existing technology, when the internet account is authenticated, it is necessary for the user to fill in the specific history evidence information of the user account. Thereby a process of the authentication is complicated and the efficiency of the authentication is poor.

SUMMARY

An identity authentication method of an internet account, an identity authentication device of an internet account and a server are provided according embodiments of the present application, in which the steps of the authentication is simple and the efficiency of the authentication is improved.

In a first aspect of the present application, an identity authentication method of an internet account is provided, which includes: receiving an identity authentication request sent by a client device, wherein the identity authentication request includes account information; acquiring identity authentication information corresponding to the account information, wherein the identity authentication information is pre-generated based on the account information and includes at least one authentication question and at least two answer options corresponding to the authentication question; sending the acquired identity authentication information to the client device; and receiving, from the client device, answer information obtained by choosing an answer from the at least two answer options corresponding to the authentication question; determining whether the received answer information meets a preset condition; and providing an identity authentication response to the client device according to a determined result.

In a second aspect of the present application, an identity authentication device of an internet account is provided, which includes: an identity authentication request receiving module configured to receive an identity authentication request sent by a client device, wherein the identity authentication request includes account information; an authentication question acquisition module configured to acquire identity authentication information corresponding to the account information, wherein the identity authentication information is pre-generated based on the account information and includes at least one authentication question and at least two answer options corresponding to the authentication question; an authentication question sending module configured to send the acquired identity authentication information to the client device; and an authentication module configured to receive, from the client device, answer information obtained by choosing an answer from the at least two answer options corresponding to the authentication question, determine whether the received answer information meets a preset condition, and provide an identity authentication response to the client device according to a determined result.

In a third aspect of the present application, a server is provided, which includes the above device.

With the embodiments of the present application, there are advantages as follows.

In the embodiments of the present application, the acquired identity authentication information may be sent to the client device to display the information on the client device. When the answer information obtained by choosing from at least two answer options corresponding to the displayed authentication question is received from the client device, it is determined whether the received answer information meets the preset condition. The identity authentication response is provided to the client device according to the determined result. With the identity authentication according to the embodiments of the present application, it is unnecessary to fill in the specific history evidence information, thereby the identity authentication is efficiently implemented and the efficiency of the identity authentication is improved.

BRIEF DESCRIPTION OF THE DRAWINGS

The drawings needed to be used in the description of the embodiments or the existing technology will be described briefly as follows, so that the technical solutions according to the embodiments of the present application or according to the existing technology will become more clearer. It is obvious that the drawings in the following description are only some embodiments of the present application. For those skilled in the art, other drawings may be obtained according to these drawings without any creative work.

FIG. 2 is a schematic diagram of a page displayed on a client device in an identity authentication method of an Internet account according to an embodiment of the present application;

DETAILED DESCRIPTION ON EMBODIMENTS

The technical solution according to the embodiments of the present application will be described clearly and completely as follows in conjunction with the drawings in the embodiments of the present application. It is obvious that the described embodiments are only a few of the embodiments according to the present application. All the other embodiments obtained by those skilled in the art based on the embodiments in the present application without any creative work belong to the scope of the present application.

In an embodiment according to the present application, a client device may include a terminal device such as a Personal Computer (PC), a tablet computer, a mobile phone and a laptop. The client device may include a client module in the terminal device, such as a client of a web browser. According to the embodiment of the present application, an identity authentication system of an internet account, an identity authentication device of an internet account, and a server may be applied to various systems requested to perform an identity authentication, such as an electronic commerce system and an instant communication application. For example, the identity authentication is performed on an account in the electronic commerce system; the identity authentication is performed when an account is logged in the instant communication application system; and the like.

In the following, an identity authentication method of an internet account according to the embodiment of the application is described in detail in conjunction with FIG. 1 and FIG. 2.

Figure 1:
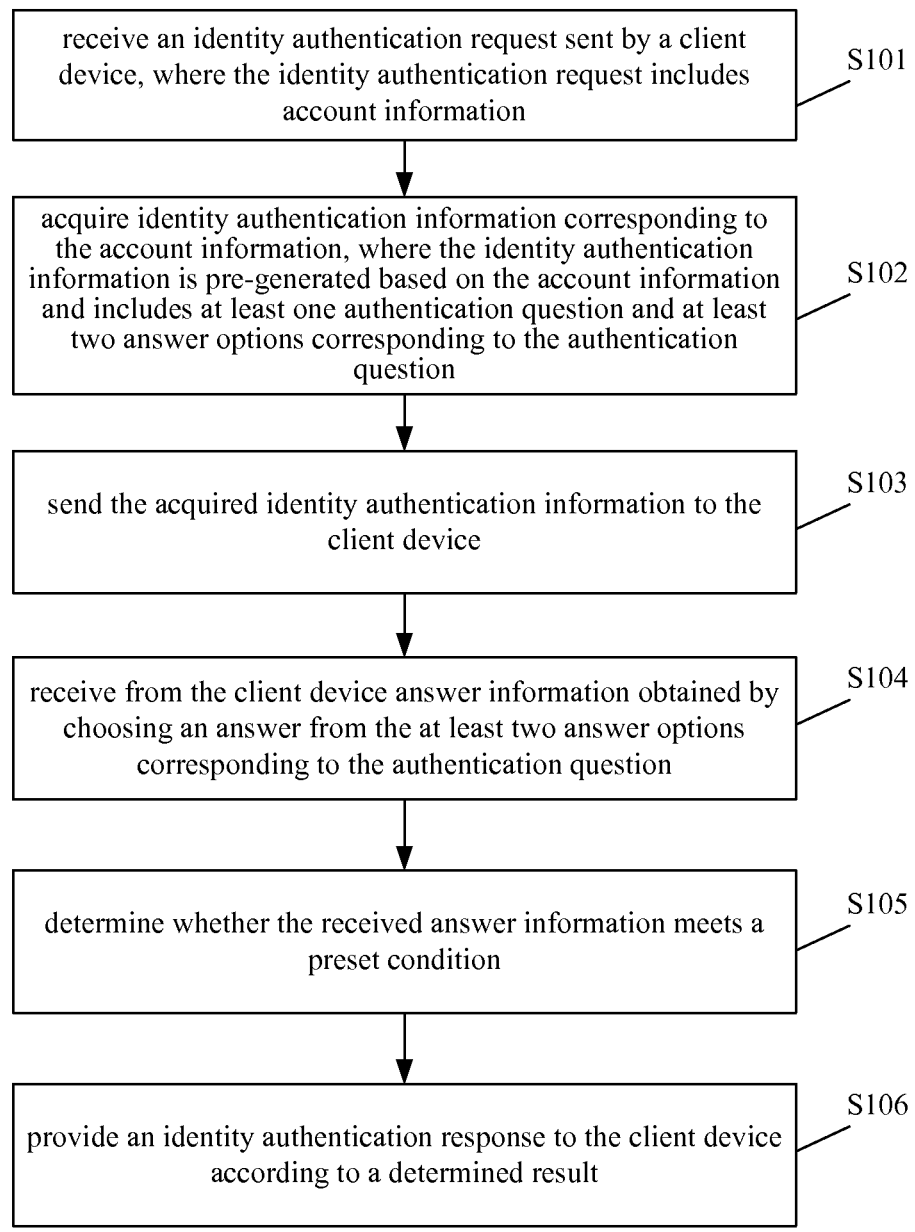
FIG. 1 is a flowchart of an identity authentication method of an internet account according to an embodiment of the present application.

Referring to FIG. 1, a flowchart of an identity authentication method of an internet account according to the embodiment of the application is shown. The method may include steps S101 to S106, which may be implemented by a server including at least one hardware processor.

In S101, an identity authentication request sent by a client device is received, where the identity authentication request includes account information.

In S102, identity authentication information corresponding to the account information is acquired, where the identity authentication information is pre-generated based on the account information and includes at least one authentication question and at least two answer options corresponding to the authentication question.

For example, the identity authentication information is generated and stored based on the account information. The identity authentication information includes at least one authentication question and at least two answer options corresponding to the authentication question. The identity authentication information corresponding to the account information is acquired from the stored identity authentication information. Each account corresponds to one piece of the identity authentication information which includes at least one authentication question and at least two answer options corresponding to the authentication question. Optionally, the account information may include an identification of the account. In an embodiment, the acquiring the identity authentication information corresponding to the account information may includes: searching for the identity authentication information corresponding to the account information from the stored identity authentication information according to the identification of the account; and acquiring at least one authentication question and at least two answer options corresponding to the authentication question from the searched identity-authentication information corresponding to the account information.

In an embodiment, a preset number of authentication questions may be acquired from the searched identity authentication information corresponding to the account information. For example, N authentication questions are included in the searched identity authentication information corresponding to the account information, where N is a positive integer larger than 0. The preset number may be m, where m is a positive integer larger than 0 and less than N. Each authentication question has a unique authentication question serial number, key (keyword). The preset number m may be for example m=10 or m=20. The preset number further may be a numeric value set based on a priority of the account. For example, a priority of a first account is a high level and a priority of a second account is a middle level, thereby the preset number m of the authentication questions corresponding to the first account may be 30; and the preset number m of the authentication questions corresponding to the second account may be 10. The preset number of the authentication questions is acquired from the searched identity authentication information corresponding to the account. For example, 10 authentication questions may be acquired randomly from 100 authentication questions in the identity authentication information corresponding to the second account, and the authentication question serial number, key, may be a serial number of the acquired authentication questions, such as 1, 3, 7, 17, 36, 45, 53, 78, 80 and 95. Each authentication question corresponds to x answer options, where x is a positive integer larger than 1. The values of x corresponding to different authentication questions may be different. For example, the authentication question 1 has x=3 answer options, the authentication question 2 has x=4 answer options, and the authentication question 3 has x=5 answer options.

In step S103, the acquired identity authentication information is sent to the client device.

The server sends the acquired identity authentication information to the client device through a wired network or a wireless network. After receiving the identity authentication information, the client device may display the identity authentication information on a display screen. For example, in the case that the acquired identity authentication information includes 10 authentication questions and each authentication question includes 4 answer options, 10 authentication questions may be displayed within one page of a browser. Alternatively, the client device may store the acquired identity authentication information; controls, with a script, the screen to display one authentication question in one page; and then further display a next authentication question after an instruction that a user of the account has made a choice for the current authentication question is received. Alternatively, the server may cache the acquired identity authentication information, and the authentication questions in the identity authentication information are sent to the client device one by one. Namely, the next authentication question is sent to the client device, once an instruction that the user of the account clicks a button of the next question on a display interface of the client device. As shown in FIG. 2, a schematic diagram of a page displayed on a client device in an identity authentication method of an Internet account according to an embodiment of the present application. In FIG. 2, there are totally 30 authentication questions and each authentication question corresponds to 4 answer options. All of the authentication questions are displayed in one page of the browser. Because a process for displaying the next question needs to suffer a buffer time, all of the authentication questions displayed in one page may save a time for authenticating the account. In addition, each authentication question corresponds to x answer options, where x is a positive integer larger than 1. The user of the account may choose an answer option directly without filling in specific history evidence information of the account, and therefore the efficiency of the identity authentication is improved.

In step S104, answer information obtained by choosing an answer from the at least two answer options corresponding to the authentication question is received from the client device.

For example, the answer information obtained by choosing an answer from the at least two answer options corresponding to the authentication question is received from the client device. As shown in FIG. 2, the user of the account chooses one answer option from the 4 answer options of each authentication question. Then, the user may click a "next" button to answer a next authentication question. Once answering all of the authentication questions, the user may click a "submit" button. In this way, the client device acquires the answer information of the account. The client device sends the obtained answer information of the account to the server. The server receives and acquires the answer information of the account.

In step S105, it is determined whether the received answer information meets a preset condition.

It is determined whether an accurate ratio of the received answer information is larger than or equal to a preset answer accurate ratio. For example, the preset answer accurate ratio may be a value set previously, which may be an arbitrary value in a range of 0.8 to 1, such as 80%, 85%, 90% and 95%. The received answer information is authenticated based on a preset correct answer, the accurate ratio of the received answer information is calculated, and then it is determined whether the accurate ratio of the answer information is larger than or equal to the preset answer accurate ratio.

In step S106, an identity authentication response is provided to the client device according to a determined result.

If it is determined in step S105 that the received answer information meets the preset condition, a response for indicating a successful identity authentication is provided to the client device; and if it is determined in step S105 that the received answer information does not meet the preset condition, a response for indicating a failure identity authentication is provided to the client device.

In an embodiment, before the step S101, an identity authentication method of an internet account according to the embodiment of the present application may further includes steps as follows.

Account information is acquired. The account information may includes but is not limited to an identification of the account, attribute information of the account, login information of the account, or communication information of the account. The identification of the account may be a registration account including a numeral, a letter, a label or the like. The attribute information of the account may include for example a nickname of the account, a registration time of the account, a level of the account and a usage duration of the account. The login information of the account may include for example a login time of the account, a login place of the account and a login number of the account. The communication information of the account may include for example a person contacted in a latest week, a communication record in the last three days, and added/deleted contact information.

Identity authentication information related to the account information is generated based on the acquired account information. For example, the identity authentication information related to the account information is generated according to a preset identity authentication information template. The preset identity authentication information template may be for example "when is the last time you logged in? A time a, B time b, C time c", where the time a, b or c is generated based on the acquired account information. The generated identity authentication information includes at least one authentication question and at least two answer options corresponding to the authentication question. For example, the identity authentication information including N authentication questions is generated for each account, where N is a positive integer larger than 0 and each authentication question corresponds to a unique authentication question serial number, key. Optionally, the generated identity authentication information may further include preset answer information corresponding to the authentication question. The value of N depends on the acquired account information. For example, for an active account, the acquired account information is more, then the authentication questions included in the generated identity authentication information is more; and for an inactive account, the acquired account information is less, then the authentication questions included in the generated identity authentication information is fewer. The active account may be determined according to the account information of the account. An account is determined to be an active account when it meets a preset active account condition, for example, logging in the account every day or that the amount of communication information exceeds preset information amount every day.

The generated identity authentication information is stored according to the identification of the account. The step of storing the generated identity authentication information specifically includes: storing the generated identity authentication information according to the identification of the account. Each account corresponds to one piece of identity authentication information and each piece of the identity authentication information includes at least one authentication question, at least two answer options corresponding to the authentication question and a preset answer corresponding to the authentication question. Optionally, the generated authentication question, the at least two answer options corresponding to the authentication question and the preset answer corresponding to the authentication question may be stored by using the authentication question serial number, key, as an identification. For example, the generated identity authentication information is stored according to the identification of the account and the authentication question serial-number, key, which may be implemented as the following program data structure:

```
Typedef struct stQuestion
{
account:
authentication question serial number key:
authentication question:
at least two answer options corresponding to the authentication question:
}
```

Optionally, an index table may be further built to be convenient to query when the generated identity authentication information is stored. The generated identity authentication information is stored in a storage region. The index table may be for example a Hash table, which has a data structure configured to be accessed directly according to a Key value, that is, a record is accessed by mapping the Key value to one location in the table, to improve the speed of the searching. Each item of the table corresponds to the identity authentication information of one account, and each sub item of the table corresponds to the authentication question included in the identity authentication information of the account. The searching is performed by using the authentication question serial number key as a key word. In addition, each item of the table may include an address link of the identity authentication information, and hence it is simple to search for and acquire the identity authentication information.

In the identity authentication method of an internet account according to the embodiment of the present application, the acquired identity authentication information may be sent to the client device to display the information on the client device. When the answer information obtained by choosing an answer from at least two answer options corresponding to the displayed authentication question is received from the client device, it is determined whether the accurate ratio of the received answer information meets the preset answer accurate ratio. The identity authentication response is provided to the client device according to the determined result. With the identity authentication in the embodiment of the present application, it is unnecessary to fill in the specific history evidence information, thereby the identity authentication is simple and the efficiency of the identity authentication is improved.

Figure 3:
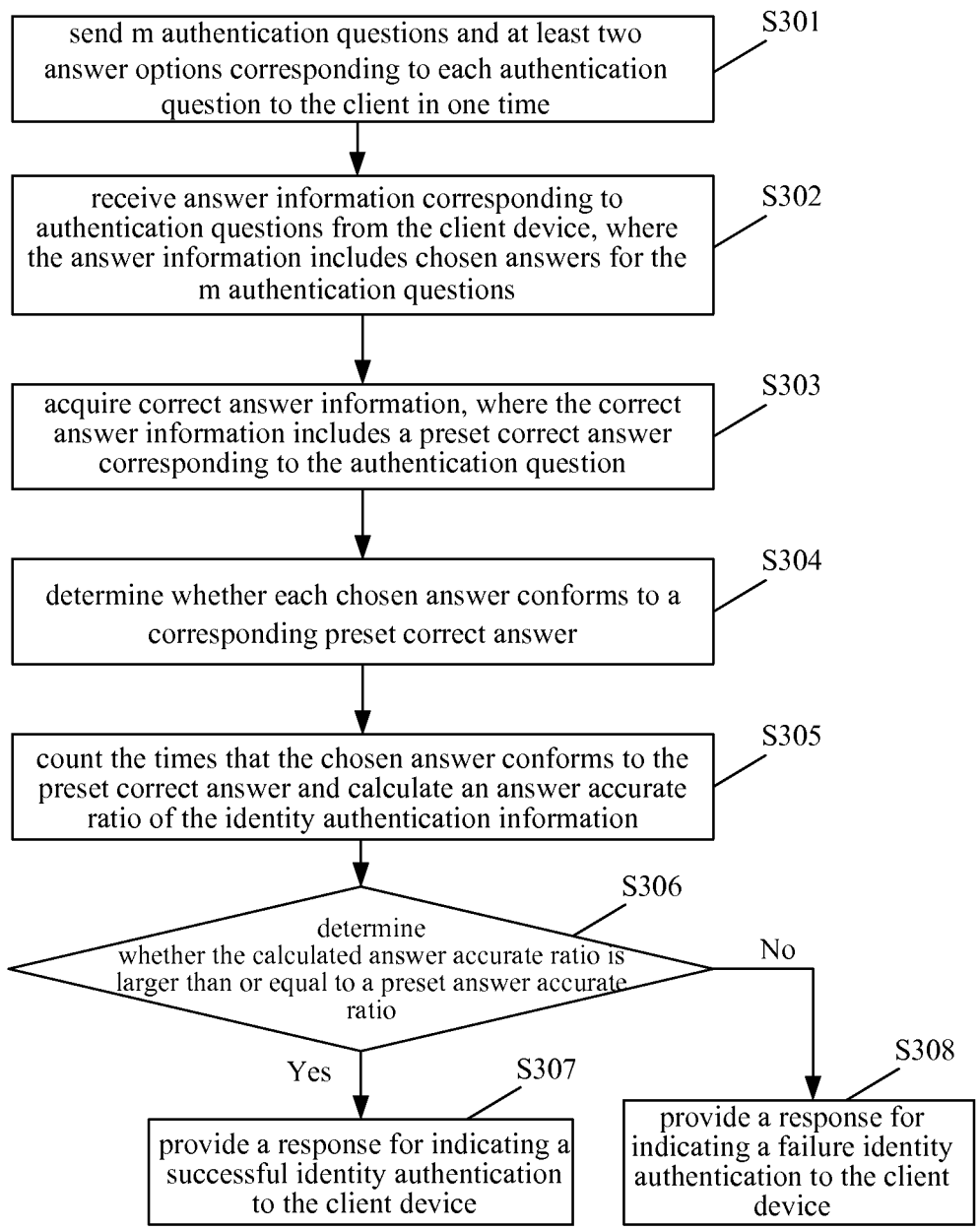
FIG. 3 is a flowchart of an authentication step according to an embodiment of the present application.

Referring to FIG. 3, a flowchart of an authentication step according to an embodiment of the present application is shown. The authentication step may include steps S301 to S308 as follows.

In step S301, m authentication questions and at least two answer options corresponding to each of the authentication questions are all sent to the client device in one time.

In step S302, answer information corresponding to authentication questions is received from the client device, where the answer information includes chosen answers for the m authentication questions. The client device receives the answer information obtained by choosing an answer from the at least two answer options corresponding to each authentication question by a user of an account, and sends the obtained answer information to the server. The server receives and further acquires the answer information of the account. For example, the user of the account chooses an answer from the at least two answer options corresponding to each authentication question. Namely, the user of the account answers each authentication question. Then, the client device caches the answer for each authentication question. Once the user of the account answers all authentication questions, the client device obtains the answer information corresponding to all authentication questions and sends the answer information to the server. The answer information is sent for only one time in the case of m authentication questions.

In step S303, correct answer information is acquired, where the correct answer information includes a preset correct answer corresponding to each authentication question. For example, identity authentication information corresponding to the account is acquired from the stored authentication information according to the identification of the account and the authentication question serial number key; and preset correct answer information corresponding to the authentication question serial number key is acquired from the identity authentication information corresponding to the account. Optionally, an address link of the preset correct answer information corresponding to the authentication question may be searched from the index table according to the identification of the account and the authentication question serial number key; and then the preset correct answer information corresponding to the authentication question serial number key is acquired according to the address link.

In step S304, it is determined whether each chosen answer conforms to a corresponding preset correct answer.

In step S305, the times that the chosen answer conforms to the preset correct answer is counted and an answer accurate ratio of the identity authentication information is calculated. The answer accurate ratio is a ratio of the times that chosen answer conforms to the preset correct answer to the number m of the obtained authentication question.

In step S306, it is determined whether the answer accurate ratio of the identity authentication information is larger than or equal to a preset answer accurate ratio; if the answer accurate ratio of the identity-authentication information is larger than or equal to the preset answer accurate ratio, step S307 is performed; else, step S308 is performed. In an embodiment, the preset answer accurate ratio is a value set previously, such as 80% and 85%.

With the identity authentication method according to the embodiment of the present application, assuming that there are x options for each question, in the case that the user randomly guesses the answers of questions, the probability of correctly guessing one question is $\frac{1}{x}$, and the probability of correctly guessing all M questions is $$\left(\frac{1}{M}\right)^M.$$

For example, in the case that x=4 and M=15, the probability of correctly guessing all questions is one billionth. Thus, the random guess may be resisted effectively with the embodiment according to the present application.

In step S307, a response for indicating a successful identity-authentication is provided to the client device.

In step S308, a response for indicating a failure identity authentication is provided to the client device. Optionally, a prompt message may be sent to the client device when the response for indicating a failure identity authentication is provided to the client device. The content of the prompt message may be that an identity authentication request for this account will not be submitted again within a preset time period, and the like. For example, the preset time period may be 5 days and 7 days.

Figure 4:
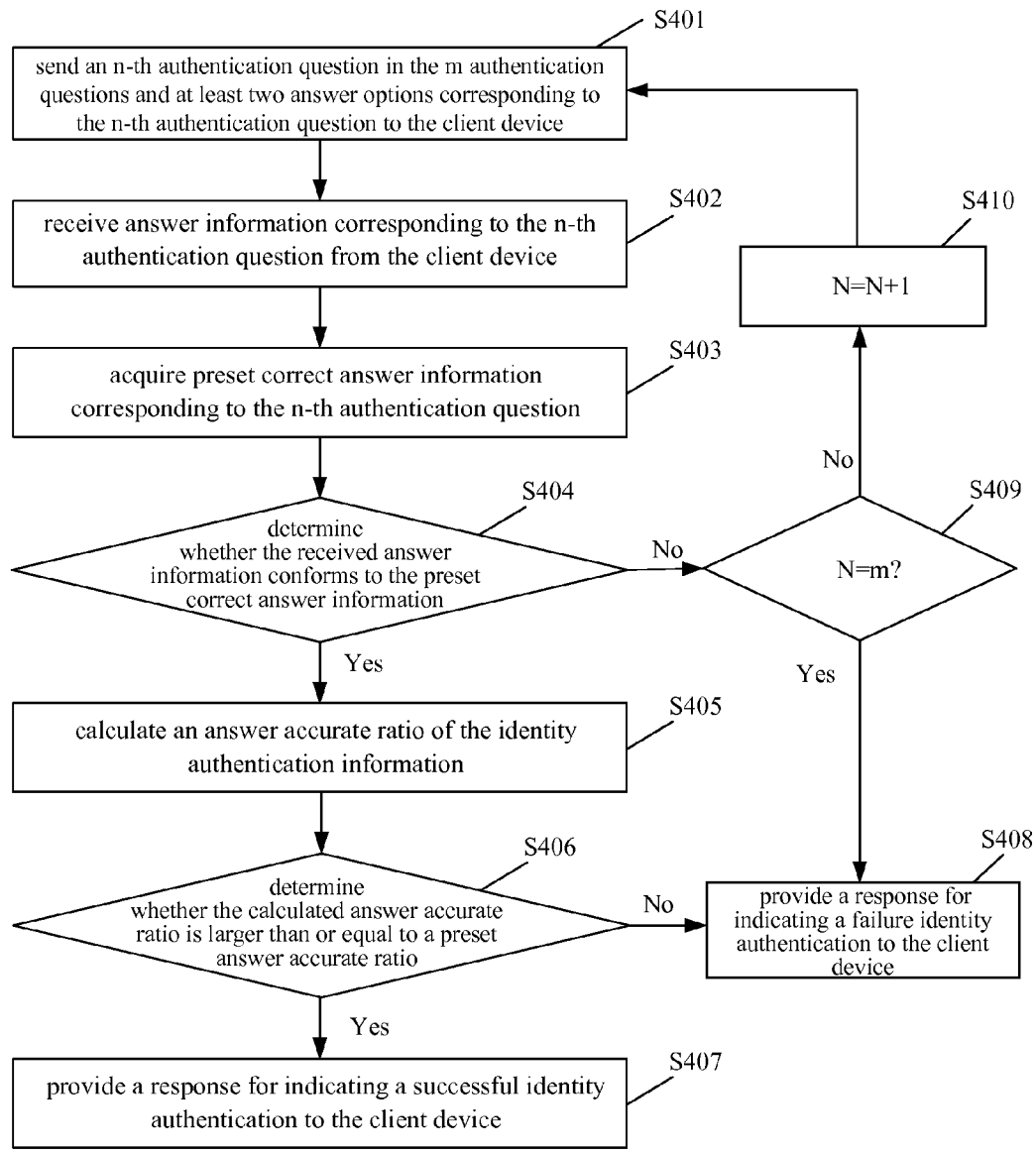
FIG. 4 is a flowchart of an authentication step according to another embodiment of the present application.

Referring to FIG. 4, a flowchart of an authentication step of another embodiment according to the present application is shown. The authentication step may include steps S401 to S407 as follows.

In step S401, an n-th authentication question in m authentication questions and at least two answer options corresponding to the n-th authentication question are sent to the client device, where m is a positive integer larger than or equal to 2, 1≤n≤m and n is a positive integer. In an embodiment, the server sends to the client device the n-th authentication question in the m authentication questions and at least two answer options corresponding to the n-th authentication question.

In step S402, answer information corresponding to the n-th authentication question is received from the client device. For example, once the user of the account chooses an answer from the at least two answer options corresponding to each authentication question, that is, once the user of the account answers one authentication question, the client device sends the answer information corresponding to the authentication question to the server. In the case of m authentication questions, the answer information corresponding to the m authentication questions is sent for m times. In an embodiment, the user of the account chooses one answer from the at least two answer options corresponding to the n-th authentication question. Then, the client device acquires the answer information chosen by the user and sends the chosen answer information to the server.

In step S403, preset correct answer information corresponding to the n-th authentication question is acquired. In an implementation, the identity authentication information corresponding to the account is acquired from the stored authentication information according to the identification of the account and the authentication question serial number key; and the preset correct answer information corresponding to the authentication question serial number key, is acquired from the identity authentication information corresponding to the account. Optionally, an address link of the preset correct answer information corresponding to the authentication question may be searched from the index table according to the identification of the account and the authentication question serial-number key; and then the preset correct answer information corresponding to the authentication question serial number key is acquired according to the address link.

In step S404, it is determined whether the received answer information conforms to the preset correct answer information. If the received answer information conforms to the preset correct answer information, step S405 is performed; else, step S409 is performed.

In step S405, an answer accurate ratio of the identity authentication information is calculated. The answer accurate ratio is a ratio of the times that the received answer information conforms to the preset correct answer information to the number m of the obtained authentication question.

In step S406, it is determined whether the answer accurate ratio of the identity authentication information is larger than or equal to a preset answer accurate ratio. If the answer accurate ratio of the identity authentication information is larger than or equal to a preset answer accurate ratio, step S407 is performed; else, step S408 is performed. In an embodiment, the preset accurate ratio is a value set previously, such as 80% and 85%.

With the identity authentication method according to the embodiment of the present application, assuming that there are x options for each question, in the case that the user randomly guesses the answers of questions, the probability of correctly guessing one question is $\frac{1}{x}$, and the probability of correctly guessing all M questions is $$\left(\frac{1}{M}\right)^M.$$

For example, in the case of x=4 and M=15, the probability of correctly guessing all questions is one billionth. Thus, the random guess may be resisted effectively with the embodiment according to the present application.

In step S407, a response for indicating a successful identity authentication is provided to the client device.

In step S308, a response for indicating a failure identity authentication is provided to the client device. Optionally, a prompt message may be sent to the client device when the response for indicating a failure identity authentication is provided to the client device. The content of the prompt message may be that an identity authentication request for this account will not be submitted again within a preset time period, and the like. For example, the preset time period may be 5 days and 7 days.

In step 409, it is determined whether n equals to m. That is to say, the server determines whether all of the authentication questions are sent to the client device.

In step S410, an operation of n=n+1 is performed and step S401 is performed continuously if n does not equal to m; and step S408 is performed if n equals to m.

In the embodiment according to the present application, the answer information obtained by choosing an answer from at least two answer options corresponding to the displayed authentication question may be received from the client device, the received answer information is authenticated according to the preset correct answer information, and the accurate ratio of the answer information is calculated. The response for indicating a successful identity authentication is provided to the client device if the accurate ratio of the answer information meets the preset correct answer ratio. The response for indicating a failure identity authentication is provided to the client device if the accurate ratio of the answer information does not meet the preset correct answer ratio. With the identity authentication according to the embodiment of the present application, it is unnecessary to fill in the specific history evidence information, thereby the identity authentication is simple and the efficiency of the identity authentication is improved.

Figure 5:
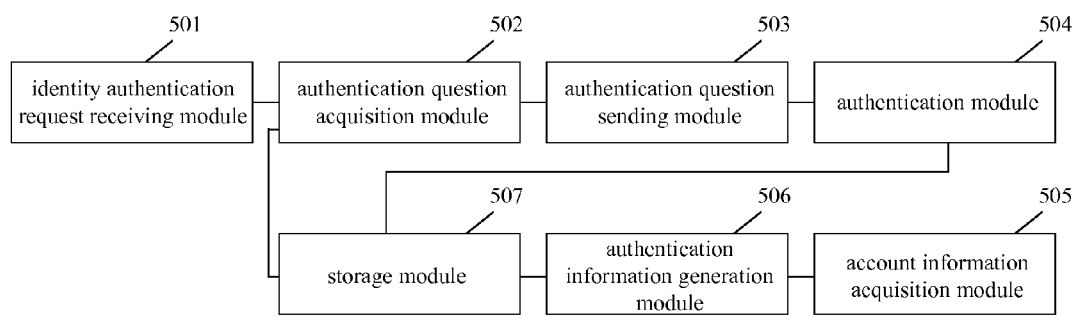
FIG. 5 is a schematic diagram of a structure of an identity authentication device of an internet account according to an embodiment of the present application.

In the following, an identity authentication device of an internet account according to an embodiment of the present application is described in detail in conjunction with FIG. 5. It should be noted that the identity authentication device of the Internet account shown in FIG. 5 is used to perform the methods of the embodiments shown in FIGS. 1, 3 and 4. For simplicity, only parts related to the embodiment according to the application are shown, and a specific technical detail which is not shown refers to the embodiments shown in FIGS. 1, 3 and 4.

Referring to FIG. 5, a schematic diagram of a structure of an identity authentication device of an internet account according to an embodiment of the present application. The device includes an identity authentication request receiving module 501, an authentication question acquisition module 502, an authentication question sending module 503 and an authentication module 504.

The identity authentication request receiving module 501 is configured to receive an identity authentication request sent by a client device, where the identity authentication request includes account information.

The authentication question acquisition module 502 is configured to acquire identity authentication information corresponding to the account information, where the identity authentication information is pre-generated based on the account information and includes at least one authentication question and at least two answer options corresponding to the authentication question.

For example, the identity authentication information is generated and stored based on the account information, which includes at least one authentication question and at least two answer options corresponding to the authentication question. The identity authentication information corresponding to the account information is acquired from the stored identity authentication information. Each account corresponds to one piece of the identity authentication information which includes at least one authentication question and at least two answer options corresponding to the authentication question. Optionally, the account information may include an identification of the account. In an embodiment, the authentication question acquisition module 502 may include a searching unit and an acquisition unit. The searching unit is configured to searching for the identity authentication information corresponding to the account information from the stored identity authentication information according to the identification of the account. The acquisition unit is configured to acquire at least one authentication question and at least two answer options corresponding to the authentication question from the searched identity authentication information corresponding to the account information.

In an embodiment, a preset number of authentication questions may be acquired from the searched identity authentication information corresponding to the account information. For example, N authentication questions are included in the searched identity authentication information corresponding to the account information, where N is a positive integer larger than 0. The preset number may be a numeric value m set beforehand, where m is a positive integer larger than 0 and less than N. Each authentication question has a unique authentication question serial number, key (keyword). The preset number m may be for example m=10 or m=20. The preset number further may be a numeric value set based on a priority of the account. For example, a priority of a first account is a high level and a priority of a second account is a middle level, thereby the preset number m of the authentication questions corresponding to the first account may be 30; and the preset number n of the authentication questions corresponding to the second account may be 10. The preset number of the authentication questions is acquired from the searched identity authentication information corresponding to the account. For example, 10 authentication questions may be acquired randomly from 100 authentication questions in the identity authentication information corresponding to the second account, and the authentication question serial number, key, may be the serial number of the acquired authentication questions, such as 1, 3, 7, 17, 36, 45, 53, 78, 80 and 95. Each authentication question corresponds to x answer options, where x is a positive integer larger than 1. The values of x corresponding to different authentication questions may be different. For example, the authentication question 1 has x=3 answer options, the authentication question 2 has x=4 answer options and the authentication question 3 has x=5 answer options.

The authentication question sending module 503 is configured to send the acquired identity authentication information to the client device.

For example, the authentication question sending module 503 sends the acquired identity authentication information to the client device through a wired network or a wireless network. After receiving the identity authentication information, the client device may display the identity authentication information on a display screen. For example, in the case that the acquired identity authentication information includes 10 authentication questions and each authentication question includes 4 answer options, the 10 authentication questions may be displayed within one page of a browser. Alternatively, the client device may store the acquired identity authentication information; controls, with a script, the screen to display one authentication question in one page; and then further display a next authentication question after an instruction that a user of the account has made a choice for the current authentication question is received. Alternatively, the server may cache the acquired identity authentication information, and the authentication questions in the identity authentication information are sent to the client device one by one. Namely, the next authentication question is sent to the client device, once an instruction that the user of the account always clicks a button of the next question on a display interface of the client device. In the schematic diagram of the display page shown in FIG. 2, there are totally 30 authentication questions and each authentication question corresponds to 4 answer options. All of the authentication questions are displayed in one page of the browser. Because a process for displaying the next question needs to suffer a buffer time, all of the authentication questions displayed in one page may save a time for authenticating the account. In addition, each authentication question corresponds to x answer options, where x is a positive integer larger than 1. The user of the account may choose an answer option directly without filling in specific history evidence information of the account, therefore the efficiency of the identity authentication is improved.

The authentication module 504 is configured to receive from the client device answer information obtained by choosing an answer from the at least two answer options corresponding to the authentication question, determine whether the received answer information meets a preset condition, and provide an identity authentication response to the client device according to a determined result.

For example, the answer information obtained by choosing an answer from the at least two answer options corresponding to the authentication question is received from the client device. As shown in FIG. 2, the user of the account chooses one answer option from the 4 answer options of each authentication question. Then, the user may click a "next" button to answer the next authentication question. Once answering all of the authentication questions, the user may click a "submit" button. In this way, the client acquires the answer information of the account. The client device sends the obtained answer information of the account to the server. The server receives and then acquires the answer information of the account; determines whether an accurate ratio of the received answer information is larger than or equal to a preset answer accurate ratio; and provides an identity authentication response to the client device according to the determined result. If the accurate ratio of the received answer information is larger than or equal to the preset answer accurate ratio, a response for indicating a successful identity authentication is provided to the client device. If the accurate ratio for the received answer information is smaller than the preset answer accurate ratio, a response for indicating a failure identity-authentication is provided to the client device. For example, the preset answer accurate ratio is a value set previously, which may be an arbitrary value in a range of 0.8 to 1, such as 80%, 85%, 90% and 95%. The received answer information is authenticated based on a preset correct answer, and the accurate ratio of the received answer information is calculated. If the accurate ratio of the received answer information is larger than or equal to the preset answer accurate ratio, the response for indicating a successful identity authentication is provided to the client device; if the accurate ratio of the received answer information is smaller than the preset answer accurate ratio, the response for indicating a failure identity authentication is provided to the client device.

Furthermore, the device according to the embodiment of the present application may further include an account information acquisition module 505, an authentication information generation module 506, and a storage module 507.

The account information acquisition module 505 is configured to acquire the account information, where the account information includes an identification of the account, attribute information of the account, login information of the account or communication information of the account.

The account information includes but is not limited to the identification of the account, the attribute information of the account, the login information of the account, or the communication information of the account. The identification of the account may be a registration account including a numeral, a letter, a label or the like. The attribute information of the account may be for example a nickname of the account, a registration time of the account, a level of the account and a usage duration of the account. The login information of the account may include for example a login time of the account, a login place of the account and a login number of the account. The communication information of the account is information such as a person contacted in a latest week, a communication record of the last three days, and added/deleted contact information.

The authentication information generation module 506 is configured to generate the identity authentication information corresponding to the acquired account information according to the account information.

For example, the identity authentication information related to the account information is generated based on a preset identity authentication information template. The preset identity authentication information template may be for example "when is the last time you log in? A time a, B time b, C time c", where the time a, b or c is generated based on the acquired account information. The generated identity authentication information includes at least one authentication question and at least two answer options corresponding to the authentication question. The identity authentication information including N authentication questions is generated for each account, where N is a positive integer larger than 0 and each authentication question corresponds to a unique authentication question serial number, key. Optionally, the generated identity authentication information may further include preset answer information corresponding to the authentication question. The value of N depends on the acquired account information. For example, for an active account, the acquired account information is more, then the authentication questions included in the generated identity authentication information is more; and for an inactive account, the acquired account information is less, then the authentication questions included in the generated identity authentication information is fewer. The active account may be determined according to the account information of the account. An account is an active account when it meets a preset active account condition, for example, logging in the account every day or that the amount of communication information exceeds preset information amount every day.

The storage module 507 is configured to store the generated identity authentication information according to the identification of the account.

The generated identity authentication information is stored. For example, the generated identity authentication information is stored according to the identification of the account. Each account corresponds to one piece of identity authentication information and each piece of the identity authentication information includes at least one authentication question, at least two answer options corresponding to the authentication question and a preset answer corresponding to the authentication question. Optionally, the generated authentication question, the at least two answer options corresponding to the authentication question and the preset answer corresponding to the authentication question may be stored by using the authentication question serial number, key, as an identification.

Optionally, an index table may be further built to be convenient to query when the generated identity authentication information is stored. The generated identity authentication information is stored in a storage region. The index table may be for example a Hash table. Each item of the table corresponds to the identity authentication information of one account, and each sub item of the table corresponds to the authentication question included in the identity authentication information of the account. The searching is performed by using the authentication question serial number key as a key word. In addition, each item of the table may include an address link of the identity authentication information, and hence it is simple to search for and acquire the identity authentication information.

In the identity authentication device of an internet account according to the embodiment of the present application, the identity authentication information acquired by the authentication question acquisition module is sent to the client device to display the information on the client device. The authentication module may receive from the client device the answer information obtained by choosing an answer from at least two answer options corresponding to the displayed authentication question, determine whether the accurate ratio of the received answer information meets the preset answer accurate ratio, and provide an identity-authentication response to the client device according to the determined result. With the identity authentication in the embodiments of the present application, it is unnecessary to fill in the specific history evidence information, thereby the identity authentication is simple and the efficiency of the identity authentication is improved.

In the following, structures and functions of embodiments of the authentication question sending module 503 and the authentication module 504 shown in FIG. 5 are described in detail in conjunction with FIGS. 6 and 7.

Figure 6:
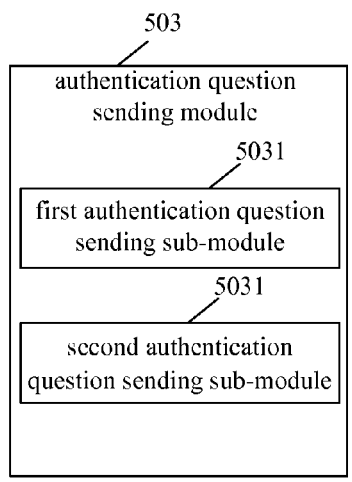
FIG. 6 is a schematic diagram of a structure of an authentication question sending module according to an embodiment of the present application.
Figure 7:
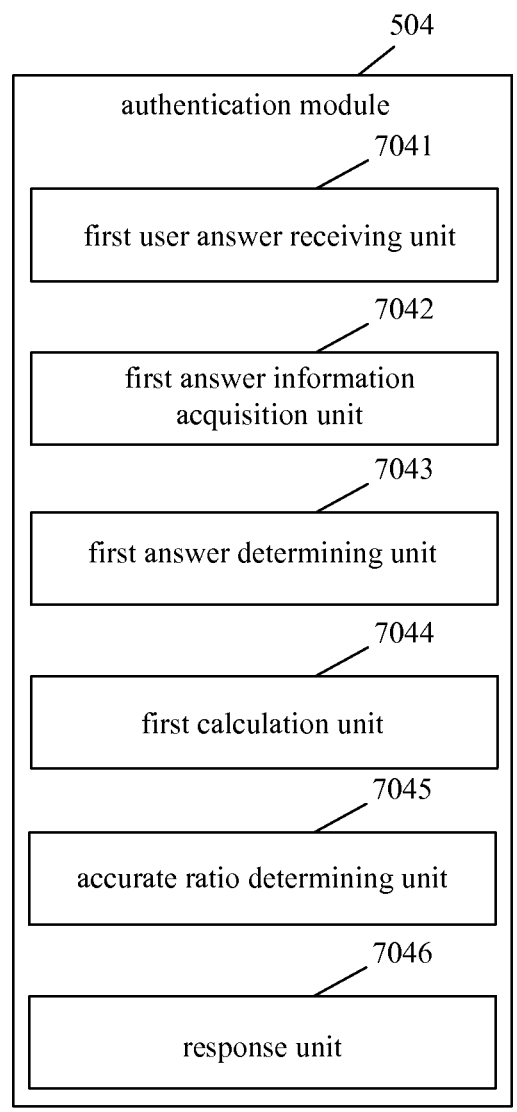
FIG. 7 is a schematic diagram of a structure of an authentication module according to an embodiment of the present application.

FIG. 6 is a schematic diagram of a structure of an authentication question sending module according to an embodiment of the present application. FIG. 7 is a schematic diagram of a structure of an authentication module according to an embodiment of the present application.

The authentication question sending module 503 may include a first authentication question sending sub-module 5031 configured to send m authentication questions in one time and at least two answer options corresponding to each of the authentication questions to the client device, where m is a positive integer larger than or equal to 2.

The authentication module 504 may include a first user answer receiving unit 7041, a first answer information acquisition unit 7042, a first answer determining unit 7043, a first calculation unit 7044, an accurate ratio determining unit 7045 and a response unit 7046.

The first user answer receiving unit 7041 is configured to receive the answer information corresponding to the authentication question from the client device, where the answer information includes chosen answers for the m authentication questions. The client device receives the answer information obtained by choosing an answer from the at least two answer options corresponding to each authentication question by a user of an account, and sends the obtained answer information to the server. The server receives and further acquires the answer information of the account. For example, the user of the account chooses an answer from the at least two answer options corresponding to each authentication question. Namely, the user of the account answers each authentication question. Then, the client device caches answer for each authentication question. Once the user of the account answers all authentication questions, the client device obtains the answer information corresponding to all authentication questions and sends the answer information to the server. The answer information is sent for only one time in the case of m authentication questions.

The first answer information acquisition unit 7042 is configured to acquire correct answer information, where the correct answer information includes a preset correct answer corresponding to each authentication question. For example, identity authentication information corresponding to the account is acquired from the stored authentication information according to the identification of the account and the authentication question serial number key; and preset correct answer information corresponding to the authentication question serial number key is acquired from the identity authentication information corresponding to the account. Optionally, an address link of the preset correct answer information corresponding to the authentication question may be searched from the index table according to the identification of the account and the authentication question serial number key; and then the preset correct answer information corresponding to the authentication question serial number key is acquired according to the address link.

The first answer determining unit 7043 is configured to determine whether each chosen answer conforms to a corresponding preset correct answer.

The first calculation unit 7044 is configured to count the times that the chosen answer conforms to the preset correct answer, and calculate an answer accurate ratio of the identity authentication information. The answer accurate ratio is a ratio of the times that the chosen answer conforms to the preset correct answer to the number m of the acquired authentication questions.

The accurate ratio determining unit 7045 is configured to determine whether the answer accurate ratio of the identity authentication information is larger than or equal to a preset answer accurate ratio.

The response unit 7046 is configured to provide a response for indicating a successful identity authentication to the client device, in the case that the accurate ratio determining unit determines that the answer accurate ratio of the identity authentication information is larger than or equal to the preset answer accurate ratio; provide a response for indicating a failure identity authentication to the client device, in the case that the accurate ratio determining unit determines that the answer accurate ratio of the identity authentication information is smaller than the preset answer accurate ratio.

With the identity authentication method according to the embodiment of the present application, assuming that there are x options for each question, in the case that the user randomly guesses the answers of questions, the probability of correctly guessing one question is $\frac{1}{x}$, and the probability of correctly guessing all M questions is $$\left(\frac{1}{M}\right)^M.$$

For example, in me case mat x=4 and M=15, the probability of i correctly guessing all questions is one billionth. Thus, the random guess may be resisted effectively with the embodiment according to the present application.

Optionally, the response unit 7046 may send a prompt message to the client device, when the response for indicating the failure identity authentication is provided to the client device. The content of the prompt message may be that an identity authentication request for this account will not be submitted again within a preset time period, and the like. For example, the preset time period may be 5 days and 7 days.

Figure 8:
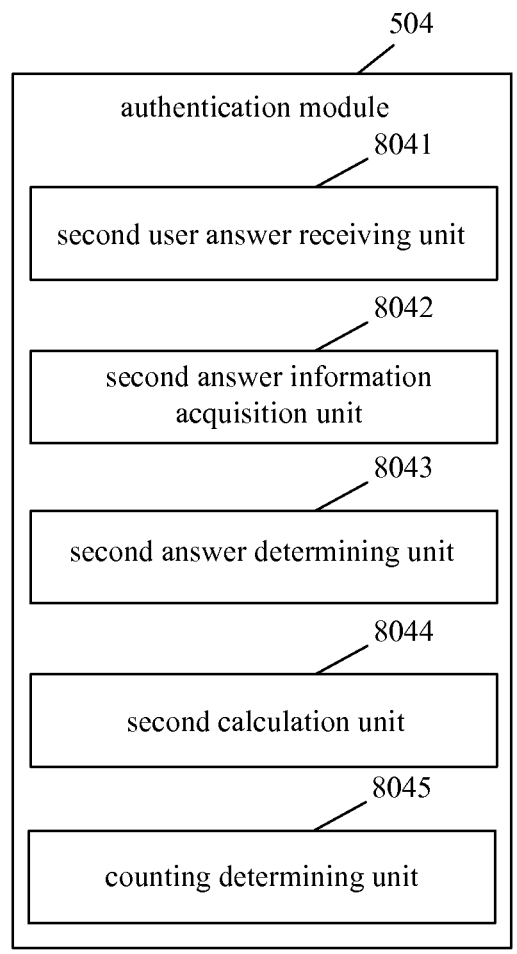
FIG. 8 is a schematic diagram of a structure of an authentication module according to another embodiment of the present application.

In the following, a structure and a function of another embodiment of the authentication module 504 shown in FIG. 5 are described in detail in conjunction with FIGS. 6 and 8.

FIG. 6 is a schematic diagram of a structure of an authentication question sending module according to an embodiment of the present application. FIG. 8 is a schematic diagram of a structure of an authentication module according to another embodiment of the present application.

The authentication question sending module 503 may include a second authentication question sending sub-module 5032 configured to send an n-th authentication question in m authentication questions and at least two answer options corresponding to the n-th authentication question to the client device, where m is a positive integer larger than or equal to 2, 1≤n≤m and n is a positive integer. In an embodiment, the server sends to the client device the n-th authentication question in the m authentication questions and the at least two answer options corresponding to the n-th authentication question.

The authentication module 504 may include a second user answer receiving unit 8041, a second answer information acquisition unit 8042, a second answer determining unit 8043, a second calculation unit 8044 and a counting determining unit 8045.

The second user answer receiving unit 8041 is configured to receive from the client device answer information corresponding to the n-th authentication question. For example, once the user of the account chooses an answer from the at least two answer options corresponding to each authentication question, that is, once the user of the account answers one authentication question, the client device sends the answer information corresponding to the authentication question to the server. In the case of m authentication questions, the answer information corresponding to m authentication questions is sent for m times. In an embodiment, the user of the account chooses one answer from the at least two answer options corresponding to the n-th authentication question. Then, the client device acquires the answer information chosen by the user and sends the chosen answer information to the server.

The second answer information acquisition unit 8042 is configured to acquire preset correct answer information corresponding to the n-th authentication question. In an implementation, identity authentication information corresponding to the account is acquired from the stored authentication information according to the identification of the account and the authentication question serial number key; and preset correct answer information corresponding to the authentication question serial number key is acquired from the identity authentication information corresponding to the account. Optionally, an address link of the preset correct answer information corresponding to the authentication question may be searched from the index table according to the identification of the account and the authentication question serial number key; and then the preset correct answer information corresponding to the authentication question serial number key is acquired according to the address link.

The second answer determining unit 8043 is configured to determine whether the received answer information conforms to the preset correct answer information.

The second calculation unit 8044 is configured to in the case that the received answer information conforms to the preset correct answer information, calculate an answer accurate ratio of the identity authentication information; determine whether the answer accurate ratio of the identity authentication information is larger than or equal to a preset answer accurate ratio, provide a response for indicating a successful identity authentication to the client device if the answer accurate ratio of the identity authentication information is larger than or equal to the preset answer accurate ratio, and provide a response for indicating a failure identity authentication to the client device if the answer accurate ratio of the identity-authentication information is smaller than the preset answer accurate ratio. The answer accurate ratio is a ratio of the times that the received answer information conforms to the preset correct answer information to the number m of the acquired authentication questions. In an implementation, the preset accurate ratio is a value set in advance, such as 80% and 85%.

With the identity authentication method according to the embodiment of the present application, assuming that there are x options for each question, in the case that the user randomly guesses the answers of questions, the probability of correctly guessing one question is $\frac{1}{x}$,
and the probability of correctly guessing all M questions is $$\left(\frac{1}{M}\right)^M.$$

For example, in the case of x=4 and M=15, the probability of correctly guessing all questions is one billionth. Thus, the random guess may be resisted effectively with the embodiment according to the present application.

In an embodiment, a prompt message may be sent to the client device when the response for indicating a failure identity authentication is provided to the client device. The content of the prompt message may be that an identity authentication request for this account will not be submitted again within a preset time period, and the like. For example, the preset time period may be 5 days and 7 days.

The counting determining unit 8045 is configured to in the case that the received answer information does not conform to the preset correct answer information, determine whether n equals to m; perform an operation of n=n+1 and instruct the second authentication question sending sub-module to send the n-th authentication question in the m authentication questions and at least two answer options corresponding to the n-th authentication question to the client device if n does not equal to m; and provide the response for indicating a failure identity authentication to the client device if n equals to m.

It should be noted that, the structure and function of the authentication module shown in FIG. 5 may be implemented with the methods of the embodiments shown in FIGS. 1, 3, and 4 of the present application. The specific implementation may be seen the related descriptions of the embodiments shown in FIGS. 1, 3 and 4, which will not be described hereinafter.

An embodiment of the present application further discloses a server including the device as shown in FIGS. 5 to 8. The structure and function of the device may refer to the related descriptions of the embodiments shown from FIGS. 5 to 8, which will not be described hereinafter. It should be noted that, the server according to the embodiment corresponds to the identity authentication method of an Internet account shown in FIGS. 1, 3 and 4, which is a subject for executing the identity authentication method of the internet account shown in FIGS. 1, 3 and 4.

Based on the description of the above embodiment, the acquired identity authentication information may be sent to the client device to display the information on the client device. When the answer information obtained by choosing an answer from at least two answer options corresponding to the displayed authentication question is received from the client device, the received answer information is authenticated according to the preset correct answer information, and an accurate ratio of the answer information is calculated. If the accurate ratio of the answer information meets a preset answer accurate ratio, a response for indicating a successful identity authentication is provided to the client device; if the accurate ratio of the answer information does not meet a preset answer accurate ratio, a response for indicating a failure identity authentication is provided to the client device. With the identity authentication in the embodiments of the present application, it is unnecessary to fill in the specific history evidence information, thereby the identity authentication is simple and the efficiency of the identity authentication is improved.

It should be understood by those skilled in the art that all or a part of flows in the embodiments described above may be achieved by a related hardware processor which is instructed by a computer program. The program may be stored in a computer readable storage medium. And when being executed, the program may include flows of the embodiments of methods as described above. For example, the storage medium may be a diskette, an optical disk, a Read-Only Memory (ROM), a Random Access Memory (RAM), or the like.

What is disclosed above are only the better embodiments of the present application and are not intended to define the scope of protection of the present application. Therefore, equivalent changes made in light of the claims of the present application are still within the scope of protection of the present application.

The invention claimed is:

1. An identity authentication method of an internet account, comprising:
   receiving, by a server comprising a hardware processor, an identity authentication request sent by a client device, wherein the identity authentication request comprises account information;
   acquiring, by the server, identity authentication information corresponding to the account information,
      wherein the identity authentication information is pre-generated based on the account information and comprises at least one authentication question and at least two answer options corresponding to the authentication question, and
      wherein the account information comprises a priority level of an account, and the number of the authentication questions is set based on the priority level of the account;
   sending, by the server, the acquired identity authentication information to the client device;
   receiving, from the client device, answer information obtained by choosing an answer from the at least two answer options corresponding to the authentication question; determining whether the received answer information meets a preset condition; and
   determining, by the server, that identity authentication of the internet account is successful, when the received answer information meets the preset condition; and sending an identity authentication response for indicating successful identity authentication to the client device.

2. The method according to claim 1, wherein before the acquiring identity authentication information corresponding to the account information, the method further comprises:
   acquiring the account information, wherein the account information comprises an identification of the account, attribute information of the account, login information of the account, or communication information of the account; and
   generating the identity authentication information corresponding to the acquired account information according to the account information.

3. The method according to claim 2, wherein after the generating the identity authentication information corresponding to the account information according to the acquired account information, the method comprises:
   storing the generated identity authentication information according to the identification of the account.

4. The method according to claim 3, wherein the acquiring the identity authentication information corresponding to the account information comprises:
   searching for the identity authentication information corresponding to the account information from the stored identity authentication information according to the identification of the account; and
   acquiring at least one authentication question and at least two answer options corresponding to the authentication question from the searched identity authentication information corresponding to the account information.

5. The method according to claim 1, wherein the identity authentication information comprises m authentication questions and at least two answer options corresponding to each authentication question, wherein m is a positive integer larger than or equal to 2.

6. The method according to claim 5, wherein
   the sending the acquired identity authentication information to the client device comprises:
      sending all m authentication questions and at least two answer options corresponding to each authentication question to the client device in one time; and
   the receiving, from the client device, answer information obtained by choosing an answer from the at least two answer options corresponding to the authentication question; determining whether the received answer information meets the preset condition; and providing an identity authentication response to the client device according to a determined result comprises:
      receiving the answer information corresponding to the authentication question from the client device, wherein the answer information comprises the chosen answers for the m authentication questions;
      acquiring correct answer information, wherein the correct answer information comprises a preset correct answer corresponding to each authentication question;
      determining whether each of the chosen answers conforms to the corresponding preset correct answer;
      counting the times that the chosen answer conforms to the preset correct answer and calculating an answer accurate ratio of the identity authentication information;
      determining whether the answer accurate ratio of the identity authentication information is larger than or equal to a preset answer accurate ratio;
      providing a response for indicating a successful identity authentication to the client device, in the case that the answer accurate ratio of the identity authentication information is larger than or equal to the preset answer accurate ratio; and
      providing a response for indicating a failure identity authentication to the client device, in the case that the answer accurate ratio of the identity authentication information is smaller than the preset answer accurate ratio.

7. The method according to claim 5, wherein the sending the acquired identity authentication information to the client device; receiving, from the client device, answer information obtained by choosing an answer from the at least two answer options corresponding to the authentication question; determining whether the received answer information meets the preset condition; and providing an identity authentication response to the client device according to the determining result comprise:
   sending to the client device an n-th authentication question in the m authentication questions and at least two answer options corresponding to the n-th authentication question, wherein n is a positive integer less than or equal to m;
   receiving answer information corresponding to the n-th authentication question from the client device;
   acquiring preset correct answer information corresponding to the n-th authentication question;
   determining whether the received answer information conforms to the preset correct answer information;
   in the case that the received answer information conforms to the preset correct answer information, calculating an answer accurate ratio of the identity authentication information; determining whether the answer accurate ratio of the identity authentication information is larger than or equal to a preset answer accurate ratio; providing a response for indicating a successful identity-authentication to the client device in the case that the answer accurate ratio of the identity authentication information is larger than or equal to the preset answer accurate ratio; and providing a response for indicating a failure identity authentication to the client device in the case that the answer accurate ratio of the identity authentication information is smaller than the preset answer accurate ratio; and in the case that the received answer information does not conform to the preset correct answer information, determining whether n equals to m; performing an operation of n=n+1 and the step of sending to the client device an n-th authentication question in the m authentication questions and the at least two answer options corresponding to the n-th authentication question in the case that n does not equal to m; and providing a response for indicating a failure identity authentication to the client device if n equals to m.

8. An identity authentication device of an internet account, comprising:
a processor and
a memory for storing a set of program codes, wherein the processor performs the set of program codes to
receive an identity authentication request sent by a client device, wherein the identity authentication request comprises account information;
acquire identity authentication information corresponding to the account information,
wherein the identity authentication information is pre-generated based on the account information and comprises at least one authentication question and at least two answer options corresponding to the authentication question, and
wherein the account information comprises a priority level of an account, and the number of the authentication questions is set based on the priority level of the account;
send the acquired identity authentication information to the client device;
receive from the client device answer information obtained by choosing an answer from the at least two answer options corresponding to the authentication question, determine whether the received answer information meets a preset condition; and
determine that identity authentication of the internet account is successful, when the received answer information meets the preset condition; and send an identity authentication response for indicating successful identity authentication to the client device.

9. The device according to claim 8, wherein the processor performs the set of program codes further to
acquire the account information, wherein the account information comprises an identification of the account, attribute information of the account, login information of the account, or communication information of the account; and
generate the identity authentication information corresponding to the acquired account information according to the account information.

10. The device according to claim 9, wherein the processor performs the set of program codes further to
store the generated identity authentication information according to the identification of the account.

11. The device according to claim 10, wherein the identity authentication request sent by the client device comprises the identification of the account;
and wherein the processor performs the set of program codes to
search for the identity authentication information corresponding to the account information from the stored identity authentication information according to the identification of the account; and
acquire at least one authentication question and at least two answer options corresponding to the authentication question from the searched identity authentication information corresponding to the account information.

12. The device according to claim 8, wherein the identity authentication information comprises m authentication questions and at least two answer options corresponding to each authentication question, wherein m is a positive integer larger than or equal to 2.

13. The device according to claim 12, wherein the processor performs the set of program codes further to
send to the client device the m authentication questions in one time and the at least two answer options corresponding to each authentication question;
receive the answer information corresponding to the authentication questions from the client device, wherein the answer information comprises the chosen answers for the m authentication questions;
acquire correct answer information, wherein the correct answer information comprises a preset correct answer corresponding to each authentication question;
determine whether each chosen answer conforms to the corresponding preset correct answer;
count the times that the chosen answer conforms to the corresponding preset correct answer, and calculate an answer accurate ratio of the identity authentication information;
determine whether the answer accurate ratio of the identity authentication information is larger than or equal to a preset answer accurate ratio; and
provide a response for indicating a successful identity authentication to the client device, in the case that the accurate ratio determining unit determines that the answer accurate ratio of the identity authentication information is larger than or equal to the preset answer accurate ratio; and provide a response for indicating a failure identity authentication to the client device, in the case that the accurate ratio determining unit determines that the answer accurate ratio of the identity authentication information is smaller than the preset answer accurate ratio.

14. The device according to claim 12, wherein the processor performs the set of program codes to
send to the client device an n-th authentication question in the m authentication questions and at least two answer options corresponding to the n-th authentication question, wherein n is a positive integer less than or equal to m;
receive answer information corresponding to the n-th authentication question from the client device;
acquire preset correct answer information corresponding to the n-th authentication question;
determine whether the received answer information conforms to the preset correct answer information;
in the case that the received answer information conforms to the preset correct answer information, calculate an answer accurate ratio of the identity authentication information; determine whether the answer accurate ratio of the identity authentication information is larger than or equal to a preset answer accurate ratio; provide a response for indicating a successful identity authentication to the client device in the case that the answer accurate ratio of the identity authentication information is larger than or equal to the preset answer accurate ratio; and provide a response for indicating a failure identity authentication to the client device in the case that the answer accurate ratio of the identity authentication information is smaller than the preset answer accurate ratio; and in the case that the received answer information does not conform to the preset correct answer information, determine whether n equals to m; perform an operation of n=n+1 and instruct the second authentication question sending sub-module to send the n-th authentication question in the m authentication questions and at least two answer options corresponding to the n-th authentication question to the client device in the case that n does not equal to m; and provide the response for indicating a failure identity authentication to the client device in the case that n equals to m.

15. A server, comprising an identity authentication device of an internet account, wherein the identity authentication device of an internet account comprises: a processor and a memory for storing a set of program codes, wherein the processor performs the set of program codes to receive an identity authentication request sent by a client device, wherein the identity authentication request comprises account information;

acquire identity authentication information corresponding to the account information,
wherein the identity authentication information is pre-generated based on the account information and comprises at least one authentication question and at least two answer options corresponding to the authentication question, and
wherein the account information comprises a priority level of an account, and the number of the authentication questions is set based on the priority level of the account;

send the acquired identity authentication information to the client device;

receive from the client device answer information obtained by choosing an answer from the at least two answer options corresponding to the authentication question, determine whether the received answer information meets a preset condition; and determine that identity authentication of the internet account is successful, when the received answer information meets the preset condition; and send an identity authentication response for indicating successful identity authentication to the client device.

16. The server according to claim 15, wherein the processor performs the set of program further codes to acquire the account information, wherein the account information comprises an identification of the account, attribute information of the account, login information of the account, or communication information of the account; and generate the identity authentication information corresponding to the acquired account information according to the account information.

17. The server according to claim 16, wherein the processor performs the set of program codes further to store the generated identity authentication information according to the identification of the account.

18. The server according to claim 15, wherein the identity authentication information comprises m authentication questions and at least two answer options corresponding to each authentication question, wherein m is a positive integer larger than or equal to 2.

19. The server according to claim 18, wherein the processor performs the set of program codes further to send to the client device the m authentication questions in one time and the at least two answer options corresponding to each authentication question;

receive the answer information corresponding to the authentication questions from the client device, wherein the answer information comprises the chosen answers for the m authentication questions;

acquire correct answer information, wherein the correct answer information comprises a preset correct answer corresponding to each authentication question;

determine whether each chosen answer conforms to the corresponding preset correct answer;

count the times that the chosen answer conforms to the corresponding preset correct answer, and calculate an answer accurate ratio of the identity authentication information;

determine whether the answer accurate ratio of the identity authentication information is larger than or equal to a preset answer accurate ratio; and provide a response for indicating a successful identity authentication to the client device, in the case that the accurate ratio determining unit determines that the answer accurate ratio of the identity authentication information is larger than or equal to the preset answer accurate ratio; and provide a response for indicating a failure identity authentication to the client device, in the case that the accurate ratio determining unit determines that the answer accurate ratio of the identity authentication information is smaller than the preset answer accurate ratio.

20. The server according to claim 18, wherein the processor performs the set of program codes to send to the client device an n-th authentication question in the m authentication questions and at least two answer options corresponding to the n-th authentication question, wherein n is a positive integer less than or equal to m;

receive answer information corresponding to the n-th authentication question from the client device;

acquire preset correct answer information corresponding to the n-th authentication question;

determine whether the received answer information conforms to the preset correct answer information;

in the case that the received answer information conforms to the preset correct answer information, calculate an answer accurate ratio of the identity authentication information; determine whether the answer accurate ratio of the identity authentication information is larger than or equal to a preset answer accurate ratio; provide a response for indicating a successful identity authentication to the client device in the case that the answer accurate ratio of the identity authentication information is larger than or equal to the preset answer accurate ratio; and provide a response for indicating a failure identity authentication to the client device in the case that the answer accurate ratio of the identity authentication information is smaller than the preset answer accurate ratio; and in the case that the received answer information does not conform to the preset correct answer information, determine whether n equals to m; perform an operation of n=n+1 and instruct the second authentication question sending sub-module to send the n-th authentication question in the m authentication questions and at least two answer options corresponding to the n-th authentication question to the client device in the case that n does not equal to m; and provide the response for indicating a failure identity authentication to the client device in the case that n equals to m.

* * * * *

UNITED STATES PATENT AND TRADEMARK OFFICE
CERTIFICATE OF CORRECTION

PATENT NO. : 9,684,777 B2
APPLICATION NO. : 14/660579
DATED : June 20, 2017
INVENTOR(S) : Jinxing Liu et al.

It is certified that error appears in the above-identified patent and that said Letters Patent is hereby corrected as shown below:

In the Specification

In Column 8, Line 55, replace the formula "$\left(\frac{1}{M}\right)^M$" with the formula -- $(\frac{1}{x})^M$ --.

In Column 10, Line 10, replace the formula "$\left(\frac{1}{M}\right)^M$" with the formula -- $(\frac{1}{x})^M$ --.

In Column 16, Line 15, replace the formula "$\left(\frac{1}{M}\right)^M$" with the formula -- $(\frac{1}{x})^M$ --.

In Column 17, Line 55, replace the formula "$\left(\frac{1}{M}\right)^M$" with the formula -- $(\frac{1}{x})^M$ --.

Signed and Sealed this
Tenth Day of April, 2018

Andrei Iancu
*Director of the United States Patent and Trademark Office*